(12) United States Patent
Morimoto et al.

(10) Patent No.: US 6,169,956 B1
(45) Date of Patent: Jan. 2, 2001

(54) VEHICLE NAVIGATION SYSTEM PROVIDING FOR DETERMINATION OF A POINT ON THE BORDER OF A MAP STORED IN MEMORY ON THE BASIS OF A DESTINATION REMOTE FROM THE AREA COVERED BY THE MAP

(75) Inventors: Kyomi Morimoto; Takaharu Fukaya; Satoshi Ogawa, all of Aichi-ken (JP); Peter Coenen; Ole Diels, both of Braine-L'Alleud (BE)

(73) Assignee: Aisin Aw Co., Ltd.(JP)

( * ) Notice: Under 35 U.S.C. 154(b), the term of this patent shall be extended for 0 days.

(21) Appl. No.: 09/032,026

(22) Filed: Feb. 27, 1998

(30) Foreign Application Priority Data

Feb. 28, 1997 (JP) .................................................. 9-046354

(51) Int. Cl.⁷ ..................................................... G01C 21/34
(52) U.S. Cl. .............................................................. 701/209
(58) Field of Search ................................... 701/209, 208, 701/201; 342/451, 452; 340/995

(56) References Cited

U.S. PATENT DOCUMENTS 5,778,333 * 7/1998 Koizumi et al. ..................... 340/995
5,845,228 * 12/1998 Uekawa et al. ..................... 701/209
6,029,112 * 2/2000 Nam et al. ........................... 701/209

* cited by examiner

*Primary Examiner*—Gregory C. Issing
(74) *Attorney, Agent, or Firm*—Lorusso & Loud

(57) ABSTRACT

A vehicle navigation system includes a present position detector, an input device for inputting information required for route searching, inclusive of information identifying a starting point and a destination, an output device for outputting route guidance, an information memory containing map data for route guidance within a geographical area, and border line data for a border line defining a perimeter for the geographical area. A central processing unit determines whether or not the detected present position or starting point and the destination are within the geographical area stored in the information memory, determines a crossing point on the border line responsive to a determination that the present position or the starting point and the destination are not both in the geographical area and determines a travel route from the present position or starting point to the destination, which travel route passes through the crossing point. The information memory may be an element additionally containing data identifying locations outside of the geographical area in the form of remote location data which is correlated with respective border points. This system allows the user to be guided to a proper border crossing point even when the destination is outside of the geographical area covered by the map data stored in the information memory element, e.g. a CD-ROM.

12 Claims, 14 Drawing Sheets

FIG.2A
SUGGESTED ROAD DATA

| NUMBER OF ROAD (n) | |
|---|---|
| 1 | ROUTE NUMBER |
|   | LENGTH |
|   | ROAD ATTRIBUTION DATA |
|   | SHAPE DATA ADDRESS, SIZE |
|   | GUIDANCE DATA ADDRESS, SIZE |
|   | . |
|   | . |
|   | . |
|   | . |
| n |   |

FIG.2B
SHAPE DATA

| THE NUMBER OF NODE (m) | |
|---|---|
| 1 | EAST LONGITUDE |
|   | NORTH LATITUDE |
|   | . |
|   | . |
|   | . |
| m |   |

FIG.2C
GUIDANCE DATA

| INTERSECTION POINT NAME |
|---|
| ROAD NAME DATA |
| CAUTION DATA |
| ROAD NAME AUDIO DATA ADDRESS, SIZE |
| COURSE DATA ADDRESS, SIZE |

FIG.2D
COURSE DATA

| THE NUMBER OF COURSE (k) | |
|---|---|
| 1 | COURSE ROUTE NUMBER |
|   | COURSE NAME |
|   | COURSE NAME AUDIO DATA ADDRESS, SIZE |
|   | COURSE DIRECTION DATA |
|   | GUIDANCE DATA |
|   | . |
|   | . |
|   | . |
| k |   |

FIG.2E
COURSE DIRECTION DATA

-1 : INVALID
 0 : UNNECESSARY
 1 : STRAIGHT
 2 : RIGHT
 3 : SLIGHT RIGHT
 4 : SHARP RIGHT
 5 : LEFT
 6 : SLIGHT LEFT
 7 : SHARP LEFT

FIG.3A
ROAD ATTRIBUTION DATA

INFORMATION AVAILABILITY
AVAILABLE : ○

| OVERPASS / UNDERGROUND DATA | OVERPASS | |
|---|---|---|
| | ADJACENT TO OVERPASS | |
| | UNDERGROUND | ○ |
| | ADJACENT TO UNDERGROUND | |
| NUMBER OF LANE | THREE LANES OR MORE | |
| | TWO LANES | ○ |
| | ONE LANE | |
| | NO CENTER LINE | |

FIG.3B
ROAD NAME DATA

| ROAD CLASSIFICATION | CLASSIFICATION NUMBER |
|---|---|

| | | |
|---|---|---|
| EXPRESSWAY | MAIN ROAD | 1 |
| | JUNCTION | 2 |
| EXPRESSWAY (INTERCITY) | MAIN ROAD | 3 |
| | JUNCTION | 4 |
| TOLL ROAD | MAIN ROAD | 5 |
| | JUNCTION | 6 |
| PUBLIC ROAD | NATIONAL ROAD | 7 |
| | PREFECTURAL ROAD | 8 |
| | OTHERS | 9 |

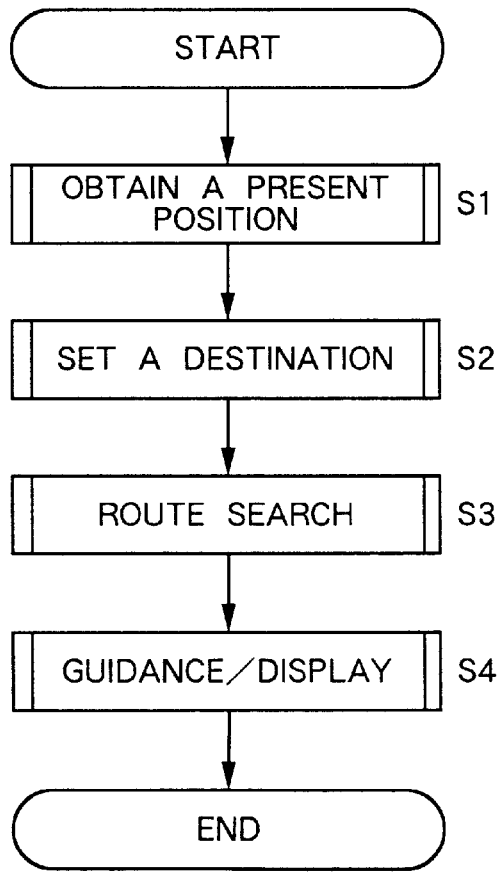

| Border Point | Coordinate | Road Name | Road Category | City | Distance | Coordinate |
|---|---|---|---|---|---|---|
| BP1 | X1Y1 | α | expressway | a | d1 | x1y1 |
| BP2 | X2Y2 | β | road | k | d2 | x2y2 |
| BP3 | X3Y3 | γ | expressway | p | d3 | x3y3 |
| ⋮ | ⋮ | ⋮ | ⋮ | ⋮ | ⋮ | ⋮ |
| BPn | XnYn | δ | road | q | dn | xnyn |

VEHICLE NAVIGATION SYSTEM PROVIDING FOR DETERMINATION OF A POINT ON THE BORDER OF A MAP STORED IN MEMORY ON THE BASIS OF A DESTINATION REMOTE FROM THE AREA COVERED BY THE MAP

BACKGROUND OF THE INVENTION

1. Field of the Invention

This invention relates to a vehicle navigation system suitable for use in driving across the border of the area for which data is stored in a CD-ROM.

2. Description of the Related Art

A vehicle navigation system stores data necessary for route guidance, such as map data, etc., in a CD-ROM, searches for a travel route to a destination by reading that stored data as occasion demands, and guides a vehicle along the travel route.

In previous navigation systems, it has been difficult to store data for a large area in one CD-ROM because a great amount of data must be stored to provide the requisite accuracy for the route search and sufficient guidance information. The current single CD-ROM is incapable of storing sufficient data for route guidance covering a wide area. For example, with regard to Europe, with the current state of the art, it is very difficult to store map data for the whole of Europe in a single CD-ROM and still provide appropriate route guidance. Therefore, the amount of data necessary for route guidance to be stored in a single CD-ROM is limited to one country or a few countries.

Thus, the previous vehicle navigation systems can only set a route in a restricted area because the data range of each CD-ROM is limited. Accordingly, such systems have proven inadequate in cases where a user often drives across a border, into an area outside the area covered by in one CD-ROM.

SUMMARY OF THE INVENTION

The present invention is designed to solve the above-described problem, and to provide an easier to use vehicle navigation system which responds when a user drives outside the area for which data is stored in one CD-ROM.

The present invention sets a crossing point on a border line of a map area and calculates a route from a present position to a destination even if a route to a destination cannot be obtained within the area covered by a single information memory element, e.g. CD-ROM. Given the ability of the present invention to calculate a route to a destination across a plurality of map areas, in a case where the data for a map area is too large to store in one information memory element, the present invention can calculate a route from a present position to a destination and offer guidance information by using a plurality of information memory elements, e.g. CD-ROMS. For example, when countries are contiguous with each other as is the case in Europe and each CD-ROM stores data for one country only, the present system can perform guidance beyond the area stored in one CD-ROM. Therefore, the utility of a vehicle navigation system is improved because of the enhancement of the accuracy of route search as well as the quality of guidance information due to the increase in utilizable data information.

By storing in a CD-ROM not only data for route guidance within a limited geographical area, data for border points shared with an adjacent geographical area outside the limited area, when a destination is set outside the limited geographical area, the present invention can execute route guidance for outside of the limited geographical area because of its ability to search for and locate a border point relating to the destination through the use of border point data and can calculate a route based on the located border point. Conversely, if the installed CD-ROM, likewise containing border point data correlated with locations outside its geographical area, is for a geographical area which includes the destination but does not include the present position or starting point, the system can search for, locate and identify a border point relating to the present position or starting point.

BRIEF DESCRIPTION OF THE DRAWINGS

FIGS. 2A–2E are diagrams showing an example of the construction of the main data file which can be utilized in the present invention.

FIGS. 3A–B are diagrams showing an example of the construction of additional data in the main data file according to the present invention.

FIGS. 4A and 4B are diagrams showing an example of the construction of yet additional data in the main data file according to the present invention.

FIG. 5 is a flow chart of the routine for control of the overall system of the present invention.

DESCRIPTION OF THE PREFERRED EMBODIMENTS

Embodiments of the present invention will now be described with reference to the drawings.

Figure 1:
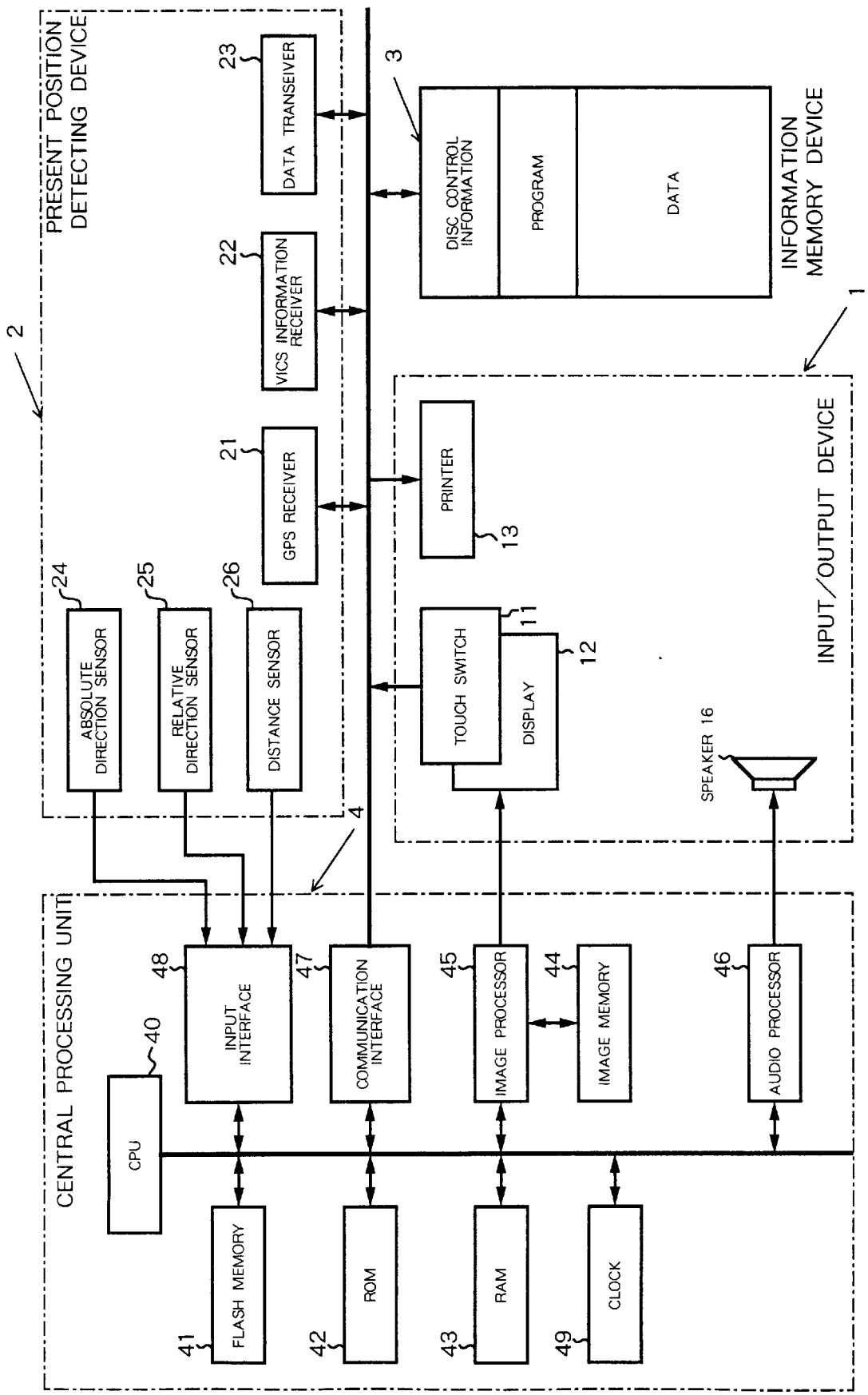
FIG. 1 is a block diagram showing one embodiment of the navigation system according to the present invention.

As shown in the block diagram of FIG. 1, a navigation system for vehicles according to the present invention includes an input/output unit 1 for input/output of information relating to route guidance, a present position detector 2 for detecting information relating to the present position of a vehicle equipped with the navigation system, an information memory 3 containing stored therein navigation data necessary for route calculation and visual/audio guidance data necessary for route guidance and the various programs (application and/or OS), etc., and a central processing unit 4 for executing a route search, for display of route guidance, and for control of the overall system.

The input/output unit 1 functions to enter destinations, to allow the driver to instruct the central processing unit 4 to execute navigation processing with output of guidance information by voice and/or screen display, and to print out the processed data. As means for implementing these functions, the input section of the input/output unit 1 has a touch switch 11 and an operation switch for entering a destination in the form of a telephone number or coordinates on a map, and for requesting route guidance. It is also possible to use a remote controller or other similar input device. The output section has a display 12 for displaying input data on a screen and for automatically displaying route guidance on the screen in response to a request from the driver, a printer 13 for printing out data processed by the central processing unit 4 and data stored in the information memory 3, and a speaker 16 for outputting route guidance by voice.

It is possible to add a voice recognition unit for enabling voice input and/or a record card reader for reading data recorded on an IC card or a magnetic card. It is also possible to add a data communication device for exchanging data between an information source such as a remote information center in which data necessary for navigation is stored and which provides necessary data through a communication channel in response to a request from the driver, or an electronic notebook in which driver's own data, e.g. map data, destination data, etc., has previously been stored.

The display 12 is a color CRT or color liquid-crystal display device. On the basis of map data and guidance data processed by the central processing unit 4, the display 12 outputs, as color displays, all screens necessary for navigation, such as a route setting screen, a screen of an interval view and a screen of intersections. The display 12 also displays buttons for setting route guidance, and for changing screens during the route guidance output. In particular, transit-intersection information, such as the names of the intersections to be traversed, is displayed in color in the form of a pop-up menu on the interval view screen, as required.

The display 12 is provided inside the instrument panel in the vicinity of the driver's seat. By observation of the interval screen the driver is able to ascertain the present location of the vehicle and to obtain information regarding a route forward from this present location. Further, the display 12 is provided with the touch switch 11 which represents a display of function buttons. The operations described above are executed responsive to signals generated by touching the buttons. Input signal generating means, constituted by the buttons and touch switch, forms the input section, a detailed description of which is omitted here.

The present position detector 2 comprises a GPS receiver 21 which utilizes a global positioning system (GPS), a VICS information receiver 22 utilizing, for example, a FM multiplex signal, radio beacon, or optical beacon, etc., a data transceiver 23 for communicating information bi-directionally with the information center (e.g. ATIS) and with other vehicles by utilizing, for example, a cellular phone (car phone), a PC (personal computer), etc., an absolute directional sensor 24 which detects the driving direction of the vehicle as an absolute direction and which may be a geomagnetic sensor, a relative directional sensor 25 which detects the direction of the vehicle as a relative direction and which may be a steering sensor or a gyro sensor, etc., and a distance sensor 26 for detecting traveling distance from the number of revolutions of a wheel. The present position detector communicates information relating to the travel of a vehicle such as road information and traffic information, detects information relating to the present position of a vehicle, and communicates information relating to the present position.

The information memory 3 is an external storage device containing navigation programs and the data for route searching and route guidance, such as a CD-ROM. The stored programs typically include a program for route searching, a program for display output control, a program for route guidance as shown in the flow charts accompanying this application, and an audio output control program for executing audio guidance. Information memory 3 also contains data required for executing the various programs, and also the display information data necessary for route guidance and map display. The stored data comprises the files of map data, search data, guidance data, map matching data, destination data, registered-location data, road data, classified data and landmark data, etc., and contains the record of all data necessary for the navigation system.

The central processing unit 4 comprises a CPU 40 for executing various forms of arithmetic processing; a flash memory 41 which reads a program from a CD-ROM loaded into the information storage device 3 and stores the program; a ROM 42 which stores a program (a program reading means) for executing a program check of the program stored in the flash memory 41 and for renewal of that program; a RAM 43 for temporarily storing searched route guidance information such as the location coordinates of a set destination, the code number of a road, and data which is in the course of being processed; an image memory 44 in which image data used to display a screen on the display unit is stored; an image processor 45 which, on the basis of a display-output control signal from the CPU 40, extracts image data from the image memory 44, process the extracted data and delivers the processed data to the display unit; an audio processor 46 which, on the basis of an audio-output control signal from the CPU, combines audio phrases, single sentences and sounds, etc. read out of the information storage device 3, converts the result into an analog signal and delivers the analog signal to the speaker 16; a communication interface 47 for exchange of input/output data by communication; a sensor-input interface 48 for accepting a sensor signal from the present-position detecting device 2; and a clock 49 for entering date and time into internal dialog information. Route guidance is performed by both screen display and audio output. The driver can select whether or not audio output is to be provided.

The program for update processing can be stored in a external storage device. A program according to the present invention and all the other programs for operating a navigation system can be stored in a CD-ROM which is an external storage medium, or a part or all of the programs can be stored in the ROM 42, which is an internal storage medium.

Data and programs stored in the external storage medium are input to the central processing unit of the navigation system as external signals, and are executed therein to implement the variety of functions of a navigation system.

As noted above, the navigation system according to the present invention includes a flash memory 41 which has relatively large capacity, for reading a program from the CD-ROM of the above described external storage device, and a ROM 42 which has a smaller capacity, containing a program (a program reading means) for CD startup processing. In case of a power failure, memory information in the flash memory 41 is saved, that is to say, flash memory 41 is a non-volatile memory. As a startup process, the navigation system activates a program stored in the ROM 42 which is a program reading means, checks a program stored in the flash memory 41, and reads disc control information, etc., from a CD-ROM loaded in the information memory device 3. Based on the information and the state of the flash memory 41, loading processing (update processing) of the program in flash memory 41 is performed.

FIGS. 2 to 4 show examples of the structure of the main data file which is stored in an information storage device 3 according to the present invention shown in FIG. 1. FIG. 2(A) shows a road guidance data file which includes the data necessary for calculating a route by utilizing a route search (calculation) means and for executing route guidance. The road guidance data file comprises route number, length, road attribute data, address and size of shape data, and address and size of guidance data, which data is in a one-to-one correspondence with n route numbers. The route numbers n are set for both directions (outbound and return) of road segments between intersections. Road attribute data, e.g. road guidance auxiliary information data as shown in FIG. 3(A), describes the road, for example, as an overpass, adjacent to a overpass, an underground road, or adjacent to an underground road, and also the number of lanes. Shape data, as shown FIG. 2(B), when roads are divided by a plurality of nodes, has coordinate data comprising east latitude and north longitude which corresponds to m node numbers.

The guidance data as shown in FIG. 2(C) includes data for names of intersections, precaution data, road name data, address and size of road name audio data, and address and size of course data. The precaution data as shown FIG. 4(A) describes potential hazards such as railroad crossings, tunnel entrances, tunnel exits, traffic lane merge points where the number of lanes is reduced, etc., and gives the driver precautions at railroad crossings and tunnels, etc., exclusive of intersections. The road name data as shown in FIG. 3(B) includes information serving to classify the road as, for example, an expressway, an urban area expressway, a tollway, a common road (a federal highway, a state highway or other), and whether the road, related to an expressway or a toll way, is the main road or an access road to/from the main road. The road name data includes both such road classification data, and also classification numbers which correspond to the road classifications.

The course data as shown in FIG. 2(D) includes course route number, course name, address and size of course name audio data, course direction data, and driving guidance data. The course name also includes the area name. Course direction data includes information such as "invalid" (don't use a given course), guidance unnecessary (route guidance is not needed here), straight, right, slight right, sharp right, left, slight left, and sharp right. The driving guidance data as shown FIG. 4(B) is for guidance as to which lane should be travelled when the road travelled has a plurality of lanes, gives instructions to stay in the right lane, left lane, center lane or any lane.

Operation of the navigation system of the present invention will now be described with reference to FIG. 5. When a program for a route guidance system is activated by CPU 40 within central processing unit 4, the navigation system detects a present position by using present position detector 2, displays on the screen 12 a map for a set area which extends from the detected present position to the periphery of the set area and displays the name of the present position, etc., (step S1). Next, the navigation system sets a destination by input of an object name (place or facility, etc.,), a telephone number, an address, or registered location, etc., (Step S2), and executes a route search from the present position to the destination (Step S3). When a travel route is determined, the navigation system repeatedly performs route guidance by display and, optionally audio, until the vehicle reaches the destination by tracking the present position using the present position detector 2 (step S4). When extra data, such as for a stopover, is input before the vehicle arrives at the destination, the navigation system sets the area to be searched, again performs a route search in the set area (e.g. area covered by the loaded CD-ROM), and executes repeated route guidance until the vehicle arrives at the destination.

Figures 6, 7:
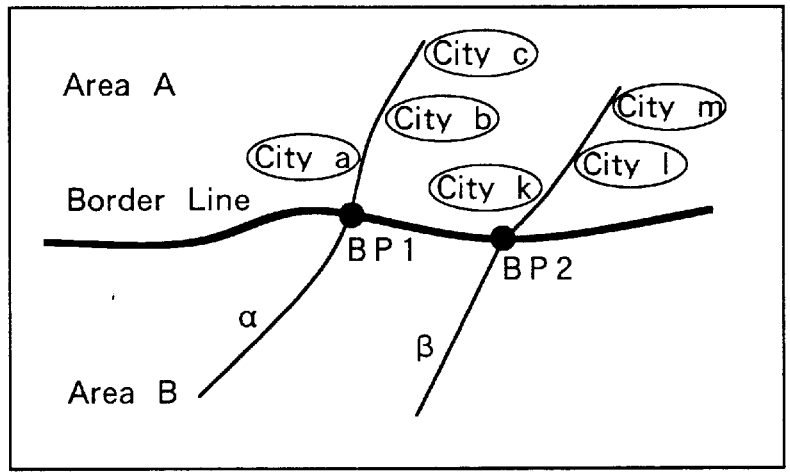
FIG. 6 is a diagram illustrating identification of cities and border points.
FIG. 7 is a table showing the structure of the border point data.

FIG. 6 and FIG. 7 describe data structure which enables the navigation system to extend a route search outside the area covered by the installed CD-ROM. With reference to FIG. 6, which explains how the system stores data for cities outside the area covered by CD-ROM as border point data, area B is the area covered by data which is stored in a single CD-ROM. To make it possible to search for area A, outside the area B stored in the installed CD-ROM, by utilizing that same CD-ROM, the ends of the roads (points of intersection of the roads with a border line on the perimeter of area B) are set as border points. For example, roads α, β . . . cross a border line (the boundary of area B of a CD) at which BP1, BP2 . . . which are set as border points. As shown in FIG. 7, the navigation system stores the coordinates of the border points, the name of the road which has the border point as its end point, and classification of the road, e.g. as an expressway or a common road, etc., data for the names of various cities outside the area covered by the CD-ROM, the coordinates of each such city, and the distance from the border point to the city, are stored in correlation with each border point. Also time of travel from the border point to the city may be included in this stored border point data. Further, the navigation system may be constructed with a standard speed assigned to each type of the road to enable estimation of the time of travel from a given border point to a particular city.

Figure 8:
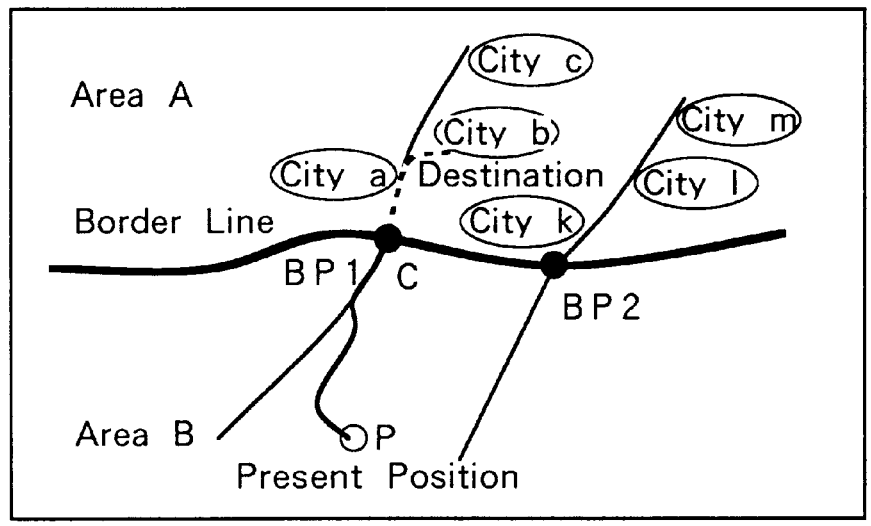
FIG. 8 is a diagram describing the process by which a destination outside the limited geographical area is set by using the CD-ROM containing data related to the present position.

A route search utilizing the above-described border line data will now be described with reference to FIG. 8. FIG. 8 shows an example wherein a CD-ROM containing stored data covering area B is loaded into the navigation system, the present position is P in the area B, and city b in the area A outside the area covered by CD-ROM is set as a destination. In this example, the navigation searches through the border point data to identify the most appropriate border point BP1 which corresponds to city b and an appropriate route from the present position to the border point BP1 is determined by search and displayed on the screen. When a CD-ROM for area A is available, a route from the border point BP1 to the destination is searched by replacing the CD-ROM for area B with CD-ROM for area A. Even if CD-ROM for area A is not available, obtaining the distance from the border point BP1 to the destination (a city) is useful for driving without assistance of the navigation system. To facilitate determination of a crossing point, optimal crossing points between two areas can be registered in advance. This enables an user to obtain the optimal route from a present position to a destination merely by setting a destination. Following the operation inputting the destination, the system identifies the area having the inputted destination and the area having the present position. Further, the system searches for the optimal crossing point to reach the destination. The crossing point identified by search can be used as the optimal border point, and an automatic route search can be executed by setting the optimal border point as a crossing point (passing point).

Figure 9:
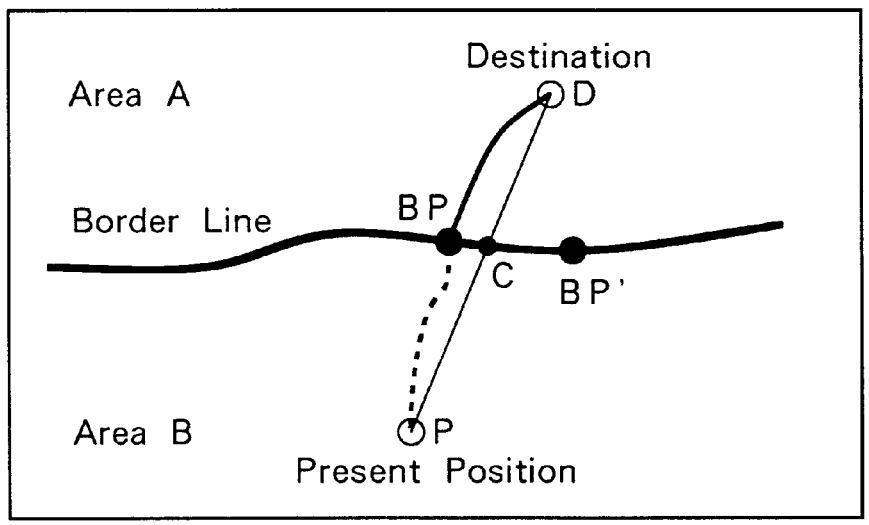
FIG. 9 is a diagram describing the routine for a route search from the present position, outside the area covered by the installed CD-ROM, to a destination within the area covered by the installed CD-ROM.

In the example illustrated in FIG. 9, when a CD-ROM for area A is installed in the navigation system, the present position is P in the area B, and city b in the area A is set as a destination. A linear line connecting the present position P with the destination D is calculated, and the point of intersection C between the linear line and the border line is obtained. Then the border point BP closest to the intersection point C is identified by a search with or without weighing considerations such as the distance to the destination and the classification of the road. Then a route from the border point BP to the destination D is determined by search. Next, a route to the border point BP is automatically searched by replacing the previously installed CD-ROM with the CD-ROM including the present position. When the CD-ROM including the present position is not available, the user must drive to the border point BP without assistance from the navigation system.

Figure 10:
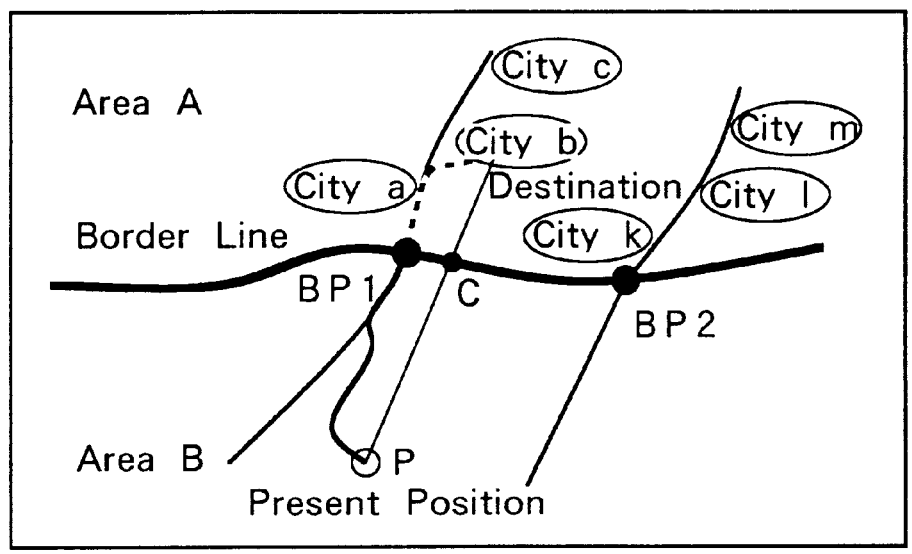
FIG. 10 is a diagram illustrating the process for setting a destination outside of the area covered by an installed CD-ROM containing the present position.

FIG. 10 illustrates a case where a CD-ROM for the area B is installed in the navigation system, the present position is P in the area B, and a city b is set as the destination or as the city closest to the destination, city b being in the area A, outside the area B stored in the CD-ROM. A postulated linear line connecting the present position P and the destination D is calculated, and the intersection point C of the linear line and the border line is determined. Then the border point BP1 closest to the intersection point C is determined by search with or without weight given to considerations such as the distance to the destination and classification of the road. Then a route to the border point BP1 is determined by search and route guidance for the determined route is provided.

Coordinates for locations outside the map area in a CD-ROM need not be stored. When the CD-ROM installed in a navigation system does not have the input destination, the system automatically displays a message to replace the CD-ROM and stores coordinates of the present position. Then, after replacing the CD-ROM with a CD-ROM containing map data for an area inclusive of the set destination, the system postulates a linear line from the destination to the present position, searches for border points by obtaining the intersection point of the linear line and the border line, and specifies one of the identified border points as a crossing point.

Figure 11:
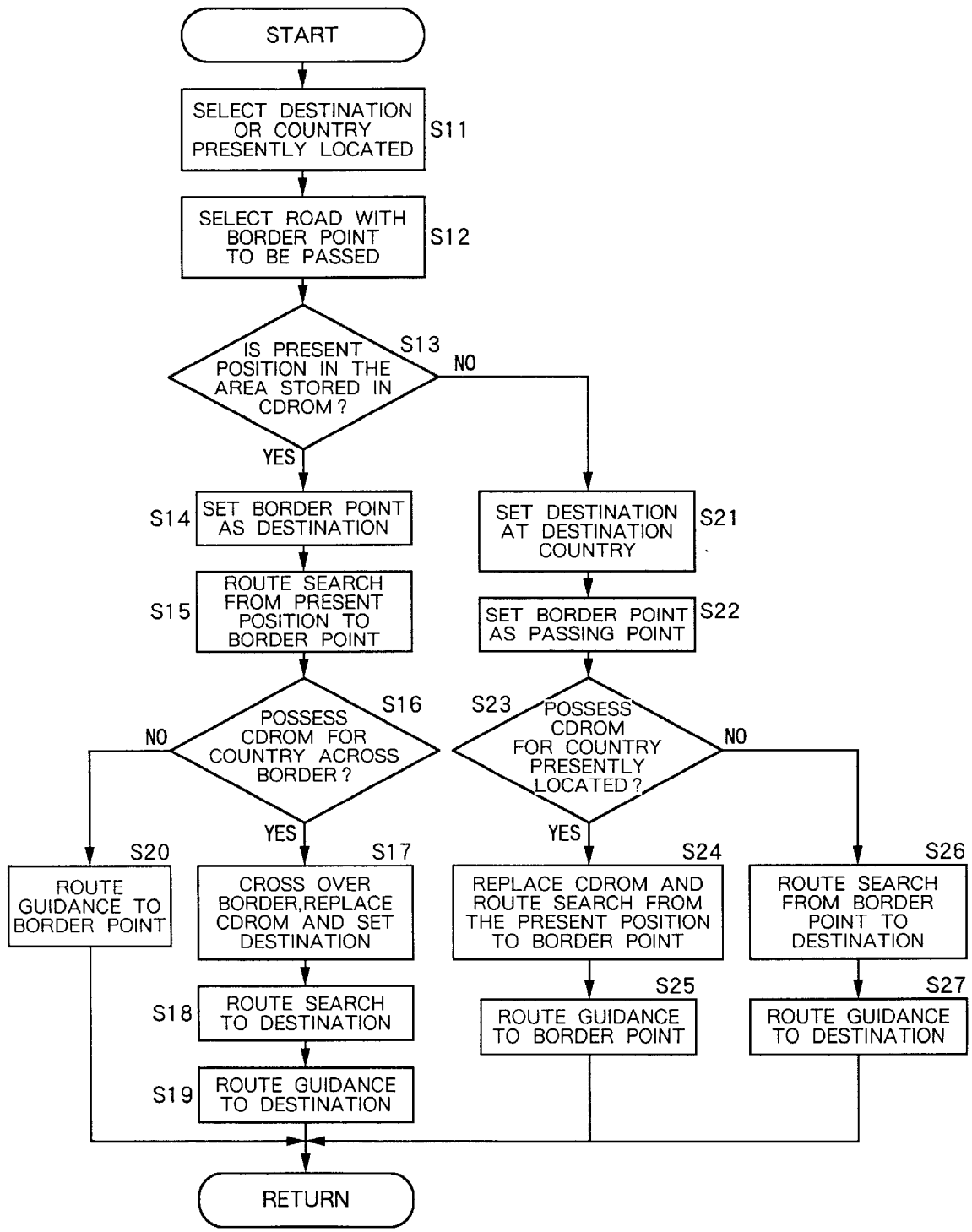
FIG. 11 is a flow chart of the navigation routine for providing guidance for a vehicle travelling between two countries contiguous with each other.

FIG. 11 describes a navigation routine using one or two CD-ROM when the border line of the area covered by a CD-ROM is a national border and the vehicle travels between two contiguous countries. First, the user selects a country containing the destination or the present position, e.g. the user selects France as the present position and Germany as the destination (Step 11) and selects a road having a national border point to be crossed (Step 12). The system determines whether or not the present position (France) is in the area covered by the CD-ROM installed in the navigation system. When the present position is in the covered area, the border point is set as a destination, and a route from the present position to the border point is searched for (Steps 13–15). Then, whether or not the user has a CD-ROM for the country on the other side of the border point, that is, Germany, is determined (Step 16). If the user has a CD-ROM for Germany, the CD-ROM for France is replaced by the one for Germany after execution of route guidance to the border point and crossing the border line, and the system executes a route search to the destination using the new CD-ROM (Germany) and provides route guidance (Steps 17–18). When the CD-ROM for Germany is not available, the system executes route search to the border point (Step 20). At step 13, when the present position is not in the area covered by the CD-ROM installed in the navigation system, Germany is set as a destination (step 21), and a border point is set as a crossing point (step 22). Then whether or not the CD-ROM for the present position is available is determined (step 23), and when the CD-ROM for the present position is available, a route search from the present position to the border and route guidance to the border point is executed after replacing the CD-ROM. When the CD-ROM for the present position is not available, a route from the border point to the destination is searched for, and route guidance to the destination is executed after the user drives to the border point without using the navigation system (steps 26–27). The foregoing description is for a system wherein the CD-ROM containing the present position is manually replaced by the CD-ROM for the destination. However, changeover between different information storage elements such as CD-ROMS can be automatically executed by an auto-changer. In using an auto-changer, a message for changeover of the information storage means need not be output.

Figure 12:
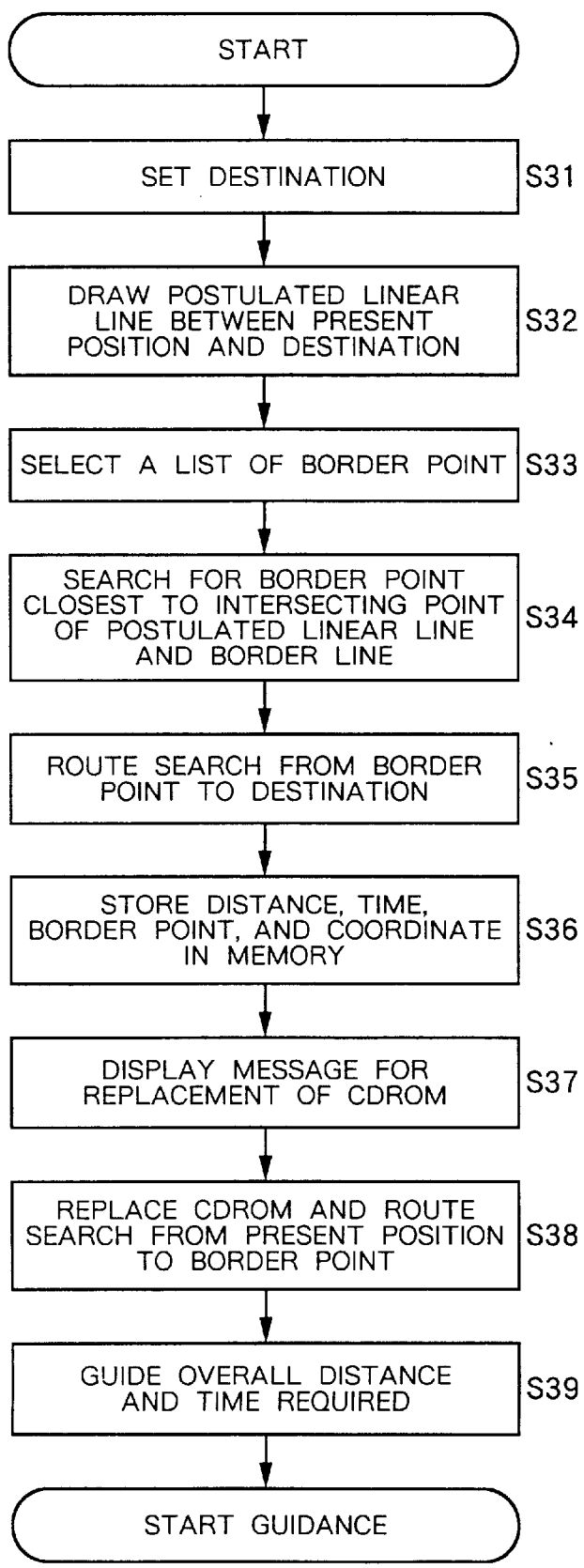
FIG. 12 is a flow chart of a routine for use in travel between two countries sharing a common border in a case where the driver has CD-ROMs for both countries, where the destination is in one of the countries and the present position or a start position is in the other country.
Figure 13:
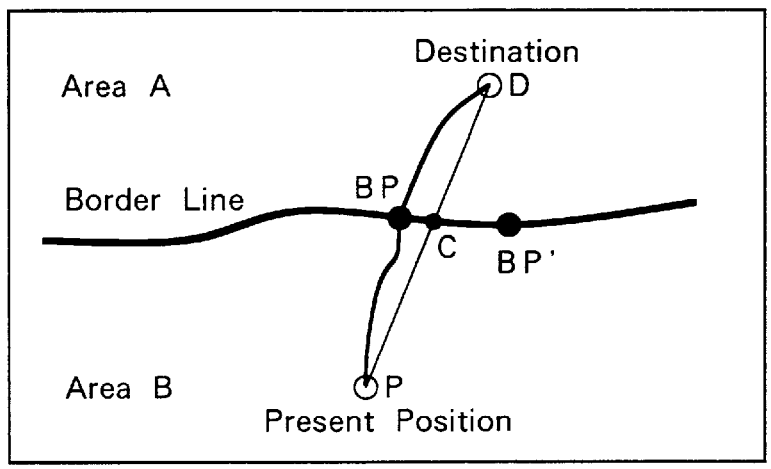
FIG. 13 is a diagram illustrating the route search according to the routine of FIG. 12.

FIG. 12 shows a flow chart of a routine which may be utilized when the user possesses both of the CD-ROMs for the two adjoining countries, where one of the CD-ROMS is for the present position and the other is for the destination. FIG. 13 illustrates the route search executed by the routine of the flow chart of FIG. 12.

Assuming the CD-ROMs for both of areas A and B are available, destination D is first set in the area A, and an postulated linear line is calculated and drawn between the present position P (or the start position) in the area B and the destination D (step 31, step 32). Then, a stored list of border points is searched to identify the closest border point to the point of intersection C between the postulated linear line and the border line (step 33, step 34). In this case, the "closest" border point can be identified taking into consideration the distance to the destination and the type of the road. Then, a route from the selected ("closest") border point BP (crossing point) to the destination D is searched and the distance, required time (calculated by average speed per hour and distance), and coordinates of the border point are stored in the memory (RAM 43). A message directing changing of the CD-ROMs is then displayed on the screen. When the user replaces the currently installed CD-ROM with the CD-ROM for the present position, the route from the present position P to the border point BP is searched (step 38). Then the overall distance and time necessary for the vehicle to travel from the present position to the border point and from the border point to the destination, is displayed on the screen (step 39), and route guidance is executed.

Figure 14:
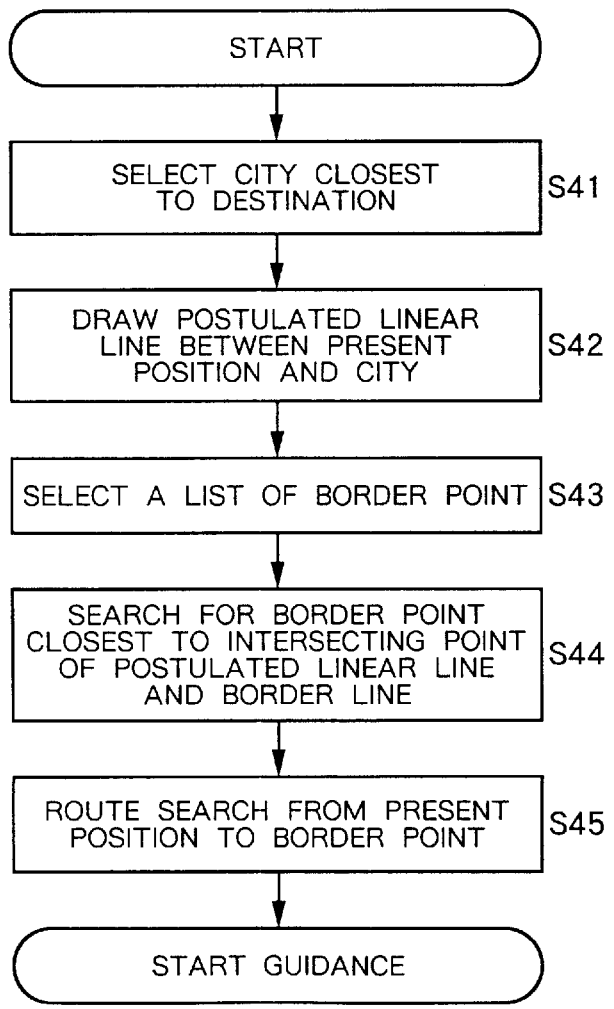
FIG. 14 is a flow chart of the route search routine illustrated in FIG. 10.

FIG. 14 shows the flow chart for the route search routine, as illustrated in FIG. 10, where only the CD-ROM for the present position (or the starting point) is available. First, the city closest to the destination is selected (step 41). As described in FIG. 7, the selected city is one for which coordinates are stored in the CD-ROM. A postulated linear line is then calculated and drawn between the present position and the selected city (step 42). Then, the list of the border points is searched (step 43) and the border point closest to the point of intersection between the postulated linear line and the border line is identified (step 44). Again, in identifying the "closest" border point, distance to the destination and the type of the road can be taken into consideration. Thus, after a border point has been selected, the route from the present position to the selected border point is searched (step 45), and route guidance is executed.

According to another embodiment, a postulated linear line is drawn between the present position and the destination, and a point of intersection (a border point) between the linear line and the border line in the map area is calculated. Next, a route search from the present position to the border point is executed. The route search identifies the most appropriate route from among a plurality of the routes to the destination passing in the vicinity of the point of intersection between the border line and the linear line.

Also the route from the present position to the destination can be searched by setting the border point closest to the point of intersection between said postulated linear line and the border line as a crossing point.

Also the route from the present position to the destination can be searched by searching for a road which intersects a border point in the vicinity of the intersection point and setting the border point on that road as the border crossing point.

According to the route determination process, the optimal route is determined based on considerations such as the distance from the present position, the type of the road, and the distance to the destination. Also the optimal passing point is determined based on considerations such as the distance from the point of intersection between the postulated linear line and the border line, the distance from the present position and the distance from the destination.

Figure 15:
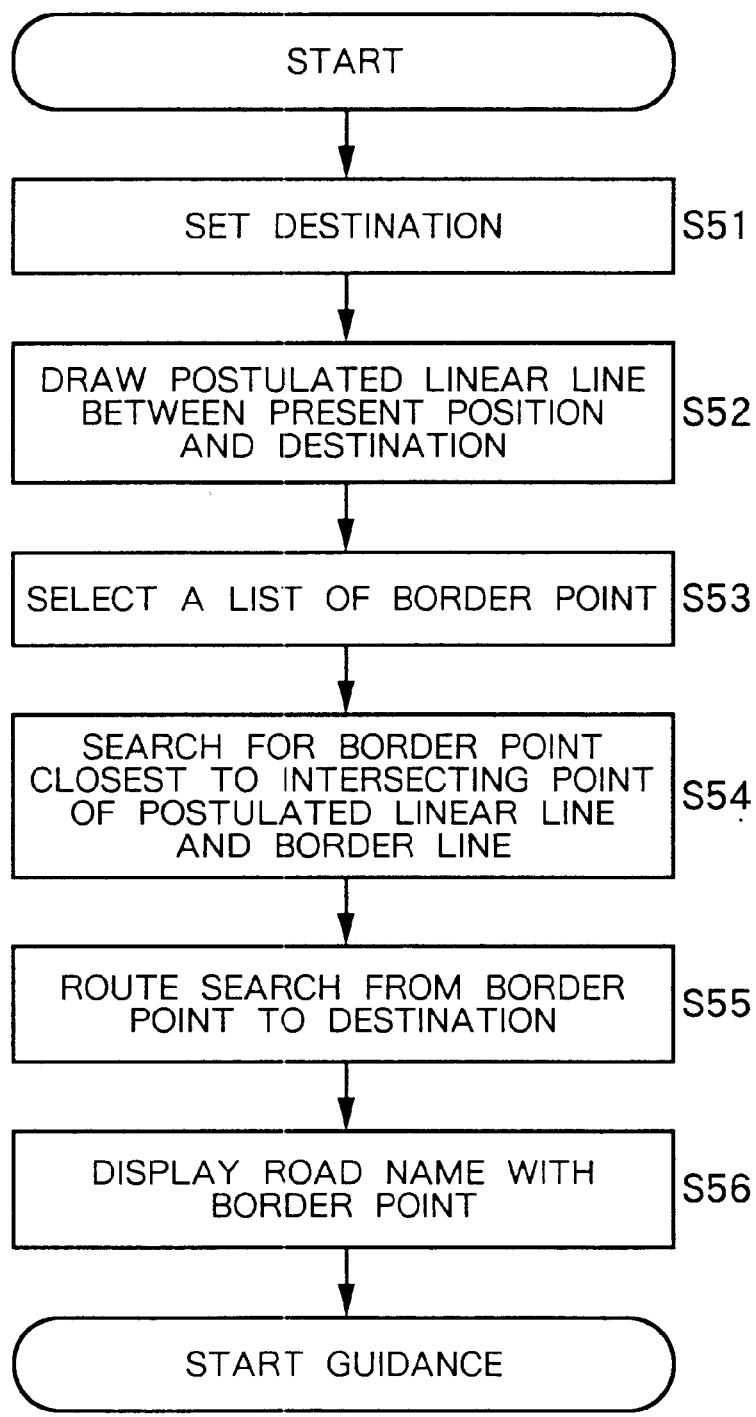
FIG. 15 is a flow chart of the route search routine illustrated in FIG. 9.

FIG. 15 is the flow chart of a routine for executing a route search as illustrated in FIG. 9 where only the CD-ROM containing a destination is available. A destination is first set, and then a postulated linear line is drawn between a present position and a destination (step 51, step 52). In this case, because a CD-ROM for the destination is installed, the coordinates of the destination are identified, and the coordinates of the present position are determined by the present position detector so that the postulated linear line can be calculated. Next, the list of border points is searched and a border point closest to the point of intersection between the postulated linear line and the border line is identified and selected as the crossing point (step 53, step 54). In this case also, the distance and the type of the road can be taken into consideration. Next, a route search is executed to determine an optimum route selected from the border point to the destination (step 55), the name of the road including the border point is displayed on the screen (step 56), and route guidance is performed. While the user must drive to the border point without use of the navigation system, the name of the road including the border point is identified to assist the user.

Figure 16:
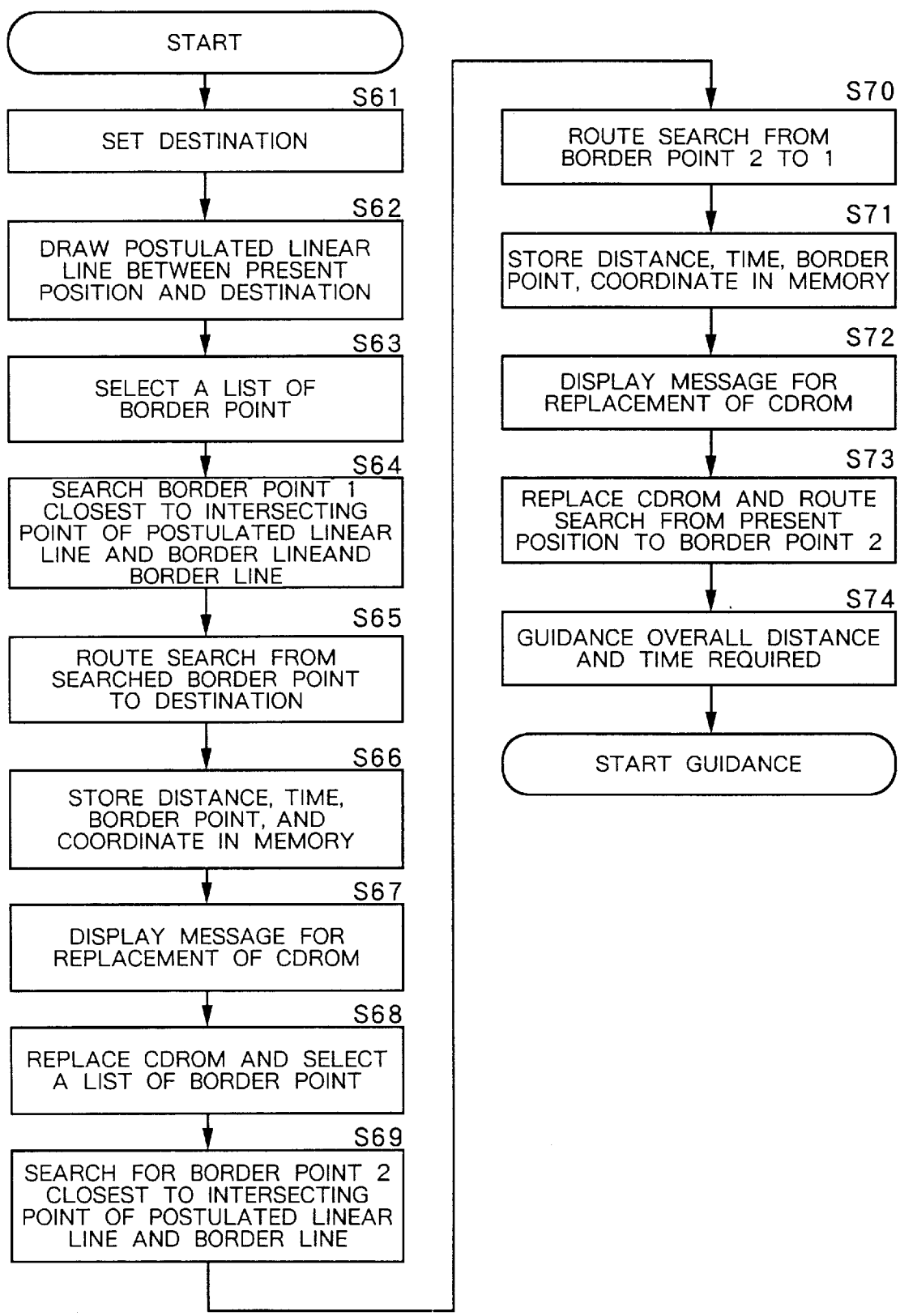
FIG. 16 is a flow chart of a routine for providing route guidance in the case where a first area containing the present position or starting point and covered by a first CD-ROM and a second area containing the destination and covered by a second CD-ROM are separated by a third area covered by a third CD-ROM.
Figure 17:
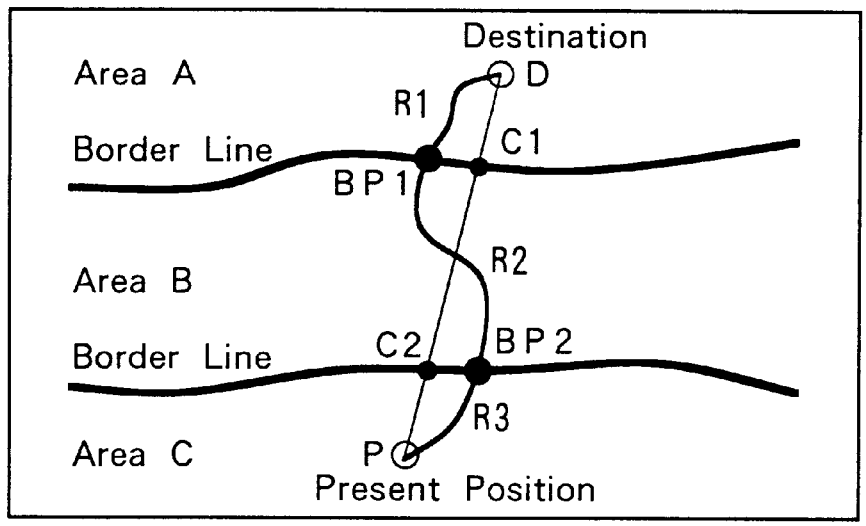
FIG. 17 is a diagram illustrating a route search according to the routine of FIG. 16.

FIG. 16 is a flow chart for a routine providing route guidance across two areas, which are separated by a third area, where there is a CD-ROM for each area. FIG. 17 illustrates the route search under these conditions. More specifically, FIG. 17 illustrates a route search for the case where the present position P is set in the area C, the destination D is set in the area A, and area B exists between area A and area C. In this case, a postulated linear line is first drawn between the present position and the destination after CD-ROM containing the destination is installed and the destination is set (step 61, step 62). Then the list of the border points is searched, border point 1 (BP1) closest to the point of intersection C1 between the border and the postulated linear line is located, route R1 from border point BP1 to the destination is searched, and the distance, the required time, and the coordinates of the selected border point are stored in memory (RAM 43) (step 63–66). Next, a message for changing the CD-ROM is displayed on the screen. After the destination CD-ROM is replaced by the CD-ROM for the intervening area B, the list of the border points is searched (step 67, step 68), the border point 2 (BP2) closest to the point of intersection C2 between the postulated linear line and the border line between area B and area C is located, route R2 from BP2 to BP1 is determined, and the distance, the required time, and the coordinates of the border points are stored in memory (step 69–step 71). Next, responsive to the message displayed on the screen, the destination CD-ROM is replaced by the CD-ROM covering the present position, a route search from the present position to the border point 2 (BP2) is executed, and the overall distance and required time are determined (step 72–74) and route guidance is performed.

The above example describes the case of one intervening area, however, in cases where there are two or more such intervening areas, the same process as above can be executed by replacing the CD-ROMs, beginning with the one closest to the destination.

Figure 18:
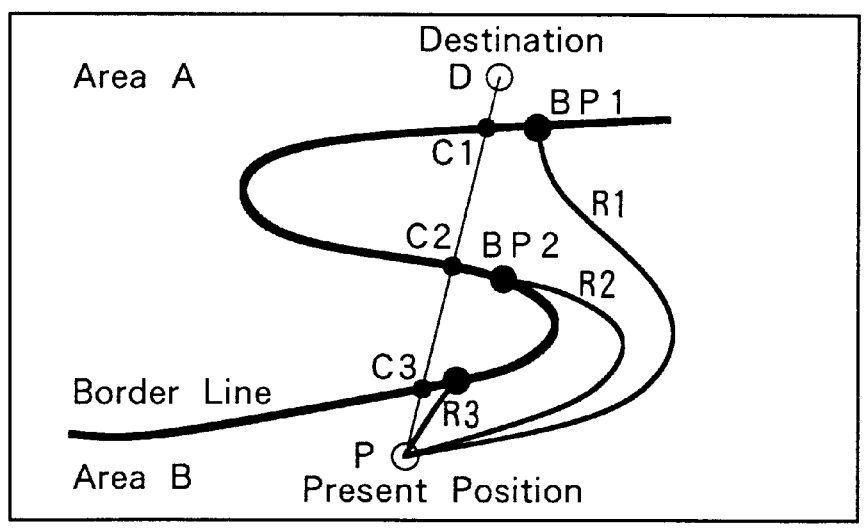
FIG. 18 is a diagram illustrating the case where the border line and a postulated linear line intersect at more than one point.
Figure 19:
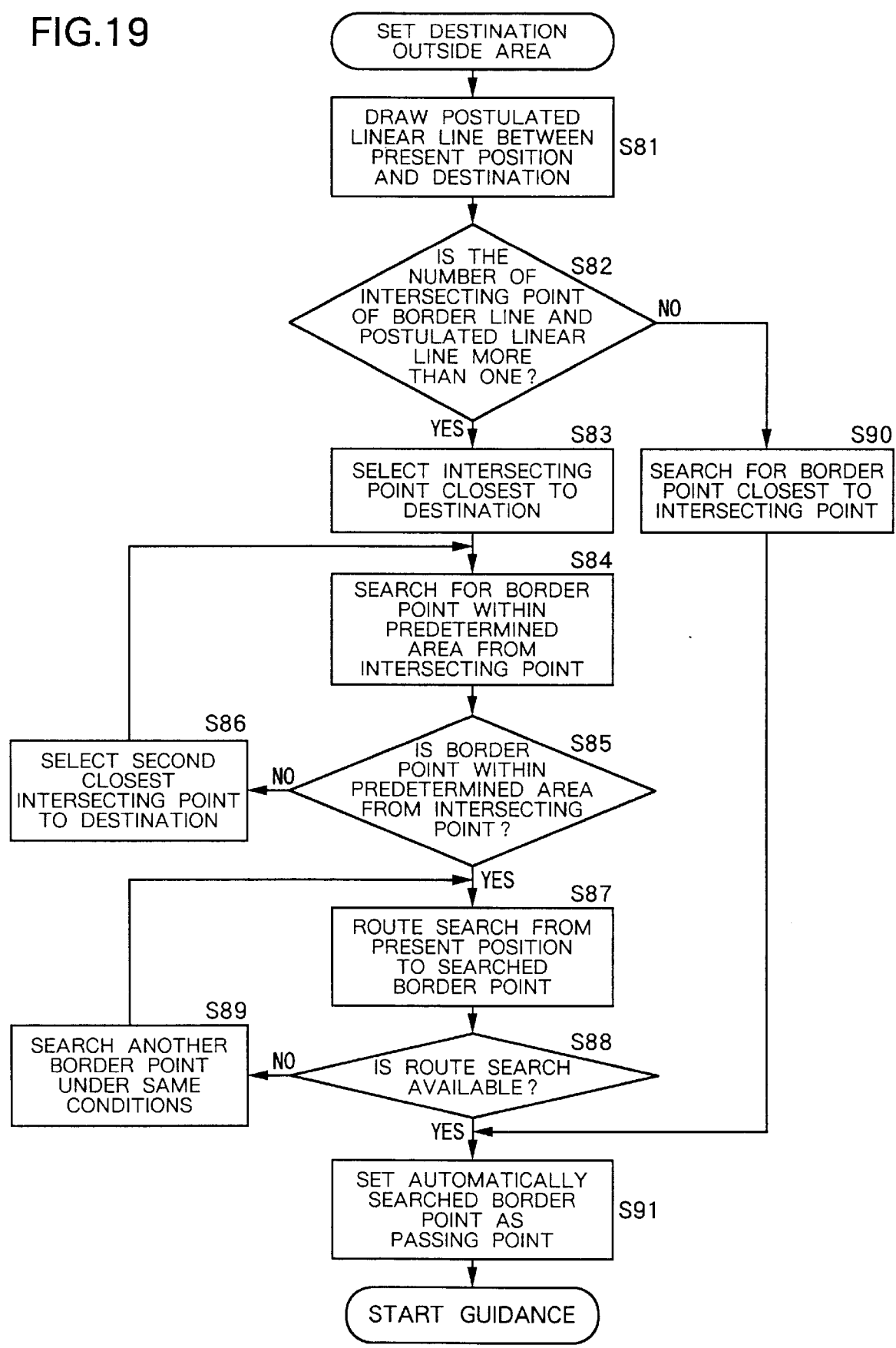
FIG. 19 is a flow chart of a routine for conducting a route search in the case illustrated by FIG. 18.

FIG. 19 is a flow chart for a routine wherein a crossing point is set where an appropriate road crosses the border line, the present position is in the area covered by the installed CD-ROM and a destination is set outside that area. In such a case where, as shown in FIG. 18, the border between area A and area B is winding, the number of intersection points may be 2 or more for a postulated linear line drawn between the present position P in the area B and the destination D in the area A. In this case, how to set a border point should be considered. Because, in this example, the installed CD-ROM includes the present position, the border point closer to the destination is given top priority so that the system can offer more precise guidance. There may be cases where a road connecting a border points C2 and C3 can not be taken, e.g. the vehicle can't reach the destination on that connecting road or the connecting road takes a long time to reach the destination. In such a complicated area, by storing data for roads in the vicinity of the border, the navigation system can search for a border point with the imposed limitation that the vehicle must pass through border points C1, C2, and C3 and can execute determination of a travel route satisfying such conditions. As shown in FIG. 19, a postulated linear line is first drawn between the present position and the destination and it is then determined whether or not the number of the intersection points is more than one (step 81). In cases where a plurality of intersection points exists, the intersection point closest to the destination (C1 of FIG. 18) is selected, and the border point within a predetermined distance from this selected intersection point is identified by search (step 83, step 84). In cases where no intersection point is found within the predetermined distance, the intersection point second closest to the destination is selected and the route search as described above is executed (step 85, step 86). Once a border point is located, a route from the present position to the border point is searched (step 87). If the route search can be completed, the located border point is automatically set as a crossing point (passing point) (step 91), and route guidance is performed. If a route search can't be completed, another border point is located for the same intersection point and the same process as described above is executed. Thus, in FIG. 18, in the case where the border point BP1 is selected, route R1 is searched, in the case of BP2, route R2, and in the case of BP3, route R3. In step 82, in cases where there exists one intersection point, the border point closest to the intersection point is selected (step 90).

The teachings of Japanese Application No. Hei 9-46354 filed Feb. 28, 1997 are incorporated by reference herein, inclusive of its specification, claims and drawings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed:

1. A vehicle navigation system comprising:

present position detection means for detecting a present position of a vehicle;

input means for inputting information required for route searching, including information identifying a starting point and a destination;

output means for outputting information for route guidance;

an information memory containing stored therein map data required for route guidance within a geographical area and border line data for a perimeter border line defining a boundary for said geographical area;

route search means for determining whether or not the detected present position or the starting point and the destination are within said geographical area stored in said information memory, for determining a crossing point on the perimeter border line responsive to a determination that the present position or the starting point and the destination are not both in said geographical area, and for determining a travel route passing through the determined crossing point.

2. A navigation system according to claim 1 wherein said information memory further contains data identifying plural border points on said perimeter border line and data identifying various registered locations outside of said geographical area, correlated with said border points.

3. A vehicle navigation system according to claim 2 wherein said map data stored in said information memory is limited to said geographical area.

4. A vehicle navigation system according to claim 2, wherein the registered locations include cities and wherein the data identifying the registered locations includes names of the cities.

5. A vehicle navigation system according to claim 4, wherein the data identifying the registered locations further includes geographical coordinates of the registered locations.

6. A vehicle navigation system according to claim 2, wherein the data identifying the registered locations includes geographical coordinates of the registered locations.

7. A vehicle navigation system according to claim 1, wherein when the linear line intersects the perimeter border line at a plurality of intersection points, said route search means determines the crossing point by assigning priorities to the plural intersection points.

8. A vehicle navigation system according to claim 1, wherein said information memory contains map data for providing route guidance within a plurality of different geographical areas separated by plural internal border lines; and wherein said route search means calculates a linear line between the present position or the starting point and the destination, identifies points of intersection of said linear line and each of the plural internal border lines; sets a crossing point on the basis of each of said points of intersection; and searches for a route stretching over each of the plurality of areas connecting with the respective crossing points.

9. A vehicle navigation system according to claim 8, wherein said map data stored in said information memory is limited to said plurality of different geographical areas.

10. A vehicle navigation system according to claim 1 wherein said map data stored in said information memory is limited to said geographical area.

11. A navigation system according to claim 1 wherein said route search means calculates a linear line between the present position or the starting point and the destination, calculates a point of intersection of the linear line and the stored border line, and determines the crossing point on the border line on the basis of the calculated point of intersection.

12. A memory element comprising, encoded thereon:

map data for route guidance, said map data covering a single geographical area, and border line data for a perimeter border line defining a boundary for said geographical area; and a route search program for calculating a linear line between a present position or starting point and a destination, responsive to a determination that the present position or the starting point and the destination area are not both in said geographical area, for calculating a point of intersection of the linear line and the stored border line, for determining a crossing point on the border line on the basis of the calculated point of intersection, and for determining a travel route passing through the determined crossing point.

* * * * *